(12) United States Patent
Baumgardner

(10) Patent No.: US 11,623,990 B2
(45) Date of Patent: Apr. 11, 2023

(54) WASTE TIRE-DERIVED ASPHALT MODIFIER

(71) Applicant: Ergon, Inc., Jackson, MS (US)

(72) Inventor: Gaylon L. Baumgardner, Jackson, MS (US)

(73) Assignee: Ergon, Inc., Flowood, MS (US)

( * ) Notice: Subject to any disclaimer, the term of this patent is extended or adjusted under 35 U.S.C. 154(b) by 432 days.

(21) Appl. No.: 16/885,919

(22) Filed: May 28, 2020

(65) Prior Publication Data

US 2020/0291234 A1 Sep. 17, 2020

Related U.S. Application Data

(63) Continuation of application No. PCT/US2018/063664, filed on Dec. 3, 2018.

(60) Provisional application No. 62/593,868, filed on Dec. 1, 2017.

(51) Int. Cl.
*C08L 95/00* (2006.01)
*C08L 19/00* (2006.01)
*C10B 53/07* (2006.01)
*E01C 7/26* (2006.01)

(52) U.S. Cl.
CPC ........... *C08L 95/005* (2013.01); *C08L 19/003* (2013.01); *C10B 53/07* (2013.01); *E01C 7/265* (2013.01); *C08L 2555/22* (2013.01)

(58) Field of Classification Search
CPC ................................. C08L 95/00; C08L 19/00
USPC ......................................................... 106/277
See application file for complete search history.

(56) References Cited

U.S. PATENT DOCUMENTS

| | | | |
|---|---|---|---|
| 3,891,585 A | 6/1975 | McDonald | |
| 3,919,148 A | 11/1975 | Winters et al. | |
| 4,069,182 A | 1/1978 | McDonald | |
| 4,085,078 A | 4/1978 | McDonald | |
| 4,430,464 A | 2/1984 | Oliver | |
| 4,485,201 A | 11/1984 | Davis | |
| 4,588,634 A | 5/1986 | Pagen et al. | |
| 5,070,109 A | 12/1991 | Ulick et al. | |
| 5,230,777 A | 7/1993 | Jarrell | |
| 5,270,361 A | 12/1993 | Duong et al. | |
| 5,334,641 A | 8/1994 | Rouse | |
| 5,389,691 A | 2/1995 | Cha et al. | |
| 5,397,818 A | 3/1995 | Flanigan | |
| 5,492,561 A | 2/1996 | Flanigan | |
| 5,583,168 A | 12/1996 | Flanigan | |
| 6,221,329 B1 | 4/2001 | Faulkner et al. | |
| 6,833,485 B2 | 12/2004 | Nichols et al. | |
| 6,835,861 B2 | 12/2004 | Nichols et al. | |
| 7,374,659 B1 | 5/2008 | Burris et al. | |
| 7,626,062 B2 | 12/2009 | Carner | |
| 7,906,011 B2 | 3/2011 | Burris et al. | |
| 8,084,521 B2 | 12/2011 | Flanigan | |
| 8,202,923 B2 | 6/2012 | Flanigan | |
| 8,512,643 B2 | 8/2013 | Steinmeyer et al. | |
| 9,453,130 B2 | 9/2016 | Wong | |
| 10,000,638 B2 | 6/2018 | Pillai et al. | |
| 2004/0182001 A1 | 9/2004 | Masemore et al. | |
| 2006/0163053 A1* | 7/2006 | Ershag | C10B 47/16 202/109 |
| 2017/0362512 A1 | 12/2017 | Hornung et al. | |

FOREIGN PATENT DOCUMENTS

| | | |
|---|---|---|
| CN | 107286685 | 10/2017 |
| FR | 2357628 | 12/1978 |
| JP | 2012020278 | 2/2012 |
| WO | WO 95/20623 | 8/1995 |
| WO | WO 2011/140448 | 11/2011 |

OTHER PUBLICATIONS

Bangfeng et al, "Hydrofining process research on removing PAHs [from] Naphthenic Vacuum Gas Oil," J. Petrochemical Universities, 30(5): 5 pages, Oct. 2017.

Budhwani, "Removal of polycyclic aromatic hydrocarbons present in tyre pyrolytic oil using low cost natural adsorbents, "International Journal of Biological, Biomolecular, Agricultural, Food and Biotechnological Enginering, 9(2): 186-190, 2015.

Baumgardner, Characterization and implementation of ground tire rubber as post-consumer polymers for asphalt concrete, (PhD Thesis, Mississippi State University, 2015).

Chaala et al., Vacuum pyrolysis of automobile shredder residues: use of the pyrolytic oil as a modifier for road bitumen, Resources, Conservation and Recycling, 26, pp. 155-172 (1999).

Fernandes et al., Evaluation of Polycyclic Aromatic Hydrocarbons in Asphalt Binder Using Matrix Solid-Phase Dispersion and Gas Chromatography, J. Chromatographic Science, 47, pp. 789-793 (Oct. 2009).

Fini et al., Investigating the effectiveness of liquid rubber as a modifier for asphalt binder, Road Materials and Pavement Design, 17:4, pp. 825-840 (2016).

Roy et al., Conversion of Used Tires to Carbon Black and Oil by Pyrolysis, Rubber Recycling, pp. 429-467 (2005).

Roy et al., The vacuum pyrolysis of used tires End-uses for oil and carbon black products, J. Anal. Appl. Pyrolysis 51, pp. 201-221 (1999).

(Continued)

*Primary Examiner* — Deve V Hall

(74) *Attorney, Agent, or Firm* — Patterson Thuente, P.A.

(57) ABSTRACT

Asphalt binders are modified using fractional products from waste tire pyrolysis, using an initial step of i) at least partially pyrolyzing, separately from such asphaltic binder, whole rubber articles or size-reduced rubber particles to provide one or more pyrolyzed rubber fractions including a pyrolyzed oil fraction having a selected minimum initial boiling point or flash point, and ii) removing some or all polycyclic aromatic hydrocarbon (PAH) compounds from such pyrolyzed oil fraction to provide a reduced-PAH and preferably translucent pyrolyzed oil fraction that may be combined with an asphaltic binder to provide a modified asphalt composition.

19 Claims, 1 Drawing Sheet

(56) References Cited

OTHER PUBLICATIONS

Sun et al., Investigation on the performance and detoxification of modified low temperature coal tarpitch, Front. Struct. Civ. Eng.. 11(3), pp. 315-321 (2017).
Walker, Understanding how tires are used in asphalt, Asphalt, 25(3), pp. 7-14 (2010), downloaded from//asphaltmagazine.com/understanding-how-tires-are-used-in-asphalt/.
Williams et al., Sulfur-polycyclic aromatic hydrocarbons in tyre pyrolysis oil, Fuel, 74(5), pp. 736-742 (1995).
Williams et al., Pyrolysis of waste tyres: A review, Waste Management,33(8), pp. 1714-1728 (2013), downloaded from //dx.doi.org/10.1016/j.wasman.2013.05.003.
International Search Report and Written Opinion for Application No. PCT/US2018/063664, dated Mar. 20, 2019, 25 pages.
Wang Shaowen, "Solid Waste Recycling Technology and Application" Metallurgical Industry Press, p. 84, paragraph 2, Jun. 2003, First Edition.
Yang Jinguo et al., "Rheological properties of blent asphalt with pyrolysis oil residue of scrap tyre," Asphalt, 29(6):7 pgs, Dec. 2005.
Yang Guanghua et al., "Heavy Oil Chemical and processing research progress", the last paragraph of p. 132, University of Petroleum Press, Jul. 1998, 1st edition.
Yousefi et al., "Effect of used-tire-derived pyrolytic oil residue on the properties of polymer-modified asphalts," Fuel 79: 975-986, Oct. 7, 1998.
Directive 2005/69/EC of the European Parliament, Office Journal of the European Union, 4 pgs., December 9, 2015.

\* cited by examiner

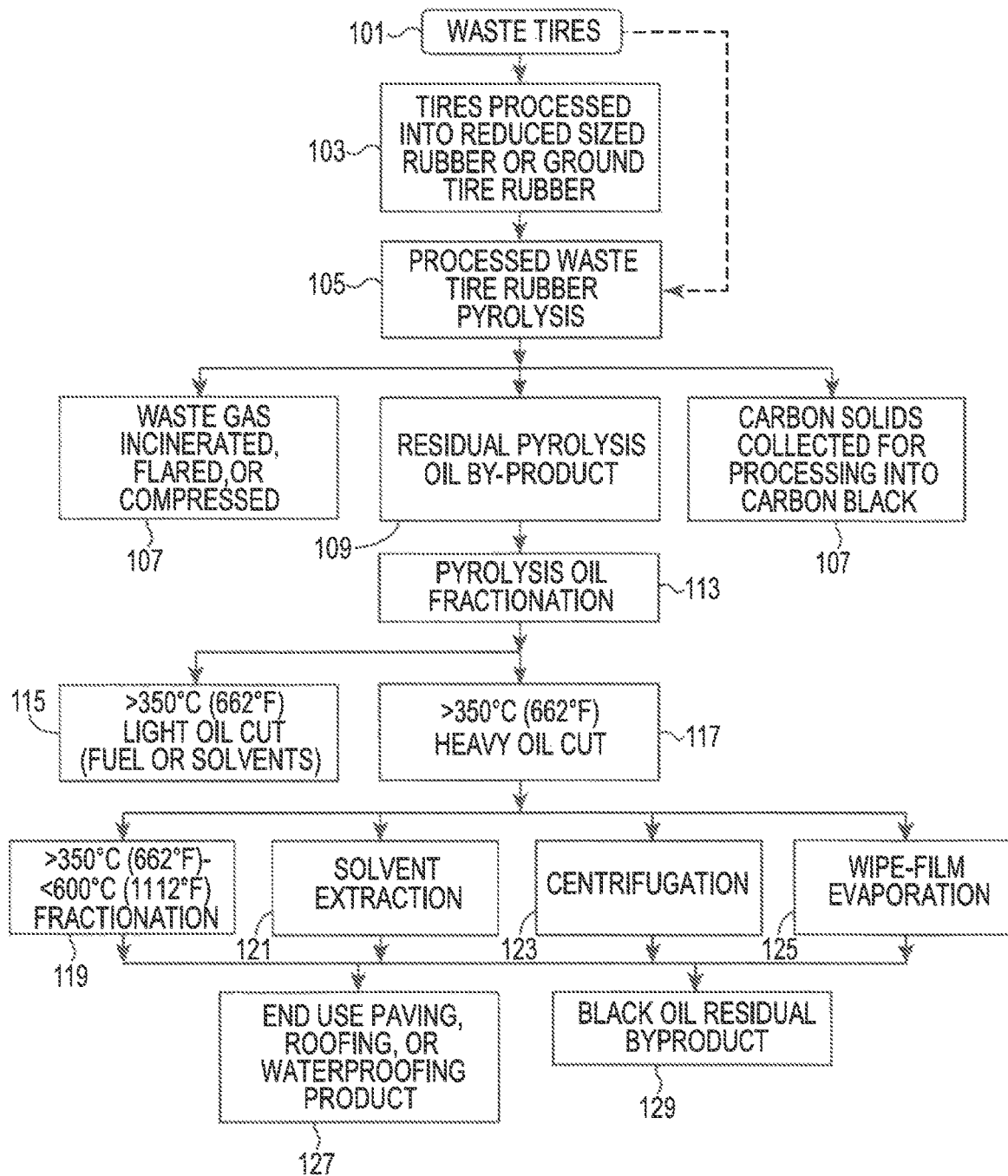

WASTE TIRE-DERIVED ASPHALT MODIFIER

CROSS-REFERENCE TO RELATED APPLICATIONS

This application is a continuation under 35 U.S.C. § 111 of International Application No. PCT/US2018/063664 filed Dec. 3, 2018 and entitled "WASTE TIRE-DERIVED ASPHALT MODIFIER", which claims priority under 35 U.S.C. § 119 to and the benefit of U.S. Provisional Application Ser. No. 62/593,868 filed Dec. 1, 2017 and entitled "WASTE TIRE-DERIVED ASPHALT MODIFIER", the disclosures of both of which are incorporated herein by reference.

TECHNICAL FIELD

This invention relates to modified asphalt binders for use in asphalt paving mixtures.

BACKGROUND

Asphalt concrete, also known as asphalt pavement, is a composite material that includes mineral aggregate and an asphalt (bitumen) binder which hardens to form a robust surface. Asphalt binder modification may be employed to improve asphalt concrete performance, for example by enhancing mix properties or by reducing or delaying three general asphalt concrete distress types: deformation (rutting and shoving), cracking (from repeated loads and low temperatures) and general deterioration (raveling and stripping). Pavement network deterioration combined with increasing material costs makes asphalt binder modification desirable.

Passenger cars and trucks on U.S. highways wear out millions of tires each year, making disposal of used tires a major environmental challenge. Reclaimed rubber from waste tires may be used as an asphalt binder modifier in production of hot-mix asphalt (HMA), warm-mix asphalt (WMA), cold-mix asphalt and asphalt pavement maintenance products. Asphalt modification currently consumes around 2% of the scrap tire market, amounting to an estimated 68,000 tons, or approximately 4.2 million tires annually.

Reclaimed tire rubber is produced from whole scrap tires through mechanical shearing and grinding, resulting in size-reduced rubber or crumb tire rubber. There are two general particle size classifications for such size-reduced rubber: "ground" rubber (also known as ground tire rubber or GTR) which is 2.0 mm (10 mesh) and smaller, and "coarse" rubber which is larger than 2.0 mm (10 mesh), with a maximum size of 12.75 mm (0.5 inch). For modified asphalt binders for road construction, size-reduced rubber typically ranges in size from about 1.5 mm (1500 μm) down to about 420 μm (viz., 15 mesh to 40 mesh), with limited use in finer sizes as small as 177 μm and 125 μm (80 mesh and 120 mesh).

Two primary methods are generally used to incorporate tire rubber into asphalt concrete. These methods are generally referred to as the "dry" and "wet" processes. The dry process involves adding GTR to the asphalt concrete mixture during production, usually by adding the GTR to the aggregate prior to introducing the required asphalt binder. The wet process involves blending tire rubber (typically GTR) with the asphalt binder and allowing a prescribed reaction time prior to mixing the tire rubber-modified binder with aggregate. Two versions of the wet process are generally employed: "asphalt rubber," (AR) commonly referred to as the "wet process" or the "McDonald process", and "rubber modified asphalt" (RMA) also referred to as "terminal blend."

Tire rubber may also be incorporated into a solvent such as petroleum distillates to make a modified petroleum distillate product that may be used for a variety of purposes. The modified petroleum distillate may for example be combined with asphalt and aggregate to make asphalt concrete, or may be used to make a variety of asphalt repair products including cutback asphalt, asphalt emulsions, asphalt surface treatments and other products that will be familiar to persons having ordinary skill in the art.

Patents or publications relating to asphalt modification using rubber products, waste rubber products, or materials derived from rubber products include U.S. Pat. No. 3,891,585 (McDonald '585), U.S. Pat. No. 3,919,148 (Winters et al.), U.S. Pat. No. 4,069,182 (McDonald '182), U.S. Pat. No. 4,085,078 (McDonald '078), U.S. Pat. No. 4,430,464 (Oliver), U.S. Pat. No. 4,485,201 (Davis), U.S. Pat. No. 4,588,634 (Pagen et al.), U.S. Pat. No. 5,070,109 (Ulick et al.), U.S. Pat. No. 5,230,777 (Jarrell). U.S. Pat. No. 5,270,361 (Duong et al.), U.S. Pat. No. 5,334,641 (Rouse), U.S. Pat. No. 5,397,818 (Flanigan '818), U.S. Pat. No. 5,492,561 (Flanigan '561), U.S. Pat. No. 5,583,168 (Flanigan '168), U.S. Pat. No. 6,221,329 B1 (Faulkner et al.), U.S. Pat. No. 6,833,485 B2 (Nichols et al. '485), U.S. Pat. No. 6,835,861 B2 (Nichols et al. '861) U.S. Pat. No. 7,374,659 B1 (Burris et al. '659), U.S. Pat. No. 7,626,062 B2 (Culler), U.S. Pat. No. 7,906,011 B2 (Burris et al. '011), U.S. Pat. No. 8,084,521 B2 (Flanigan '521), U.S. Pat. No. 8,202,923 B2 (Flanigan '923) and U.S. Pat. No. 8,512,643 B2 (Steinmeyer et al.); U.S. Patent Application Publication No. US 2004/0182001 A1 (Masemore et al.); International Application Publication No. WO 95/20623; and in Fini et al., *Investigating the effectiveness of liquid rubber as a modifier for asphalt binder*, Road Materials and Pavement Design, 17:4, 825-840 (2016); Baumgardner, *Characterization and implementation of ground tire rubber as post-consumer polymers for asphalt concrete*, (PhD Thesis, Mississippi State University, 2015); Roy, *Vacuum pyrolysis of used tires End-uses for oil and carbon black products*, J. Anal. Appl. Pyrolysis 51, 201-221 (1999) and Walker, *Understanding how tires are used in asphalt,* Asphalt, 25:3, 7-14 (2010). Some of the processes described in these documents require extended processing times, extensive heating (and consequent degradation) of the asphalt binder, or produce side products that must be separately dealt with, and some of these processes add substantial amounts of carbon black or rubber to asphalt.

From the foregoing, it will be appreciated that what is needed in the art are improved reclaimed rubber asphalt modifiers. Such reclaimed rubber asphalt modifiers and methods for their preparation and use are disclosed and claimed herein.

SUMMARY OF THE INVENTION

The present invention provides methods for modifying an asphaltic binder using a fractional oil product obtained from waste tire pyrolysis. In a first aspect, the method comprises the steps of i) at least partially pyrolyzing, separately from such asphaltic binder, whole rubber articles or size-reduced rubber particles to provide one or more pyrolyzed rubber fractions including a pyrolyzed oil fraction having a selected minimum initial boiling point or flash point, and ii) removing at least some polycyclic aromatic hydrocarbon (PAH) compounds from such pyrolyzed oil fraction to provide a reduced-PAH and preferably translucent pyrolyzed oil fraction that may be combined with an asphaltic binder to provide a modified asphalt composition.

In a second aspect, the disclosed removal of at least some PAH compounds is performed by one or more of:
  i) fractionally distilling the pyrolyzed oil fraction over a temperature range that removes a desired initial boiling point or desired minimum flash point pyrolyzed oil fraction and leaves behind at least some PAH compounds;
  ii) solvent extracting the pyrolyzed oil fraction using one or more solvents that remove a desired initial boiling point or desired minimum flash point pyrolyzed oil fraction and leave behind at least some PAH compounds;
  iii) centrifuging the pyrolyzed oil fraction to separate a desired initial boiling point or desired minimum flash point pyrolyzed oil fraction from a fraction containing concentrated PAH compounds; or
  iv) wiped film evaporating a desired initial boiling point or desired minimum flash point pyrolyzed oil fraction and leaving behind at least some PAH compounds.

In some embodiments, the removed pyrolyzed oil fraction primarily contains components having initial boiling points or flash points that fall within a 150, a 200 or a 250° C. temperature range.

In another aspect, the disclosed pyrolyzed oil fraction is combined with (e.g., injected into) a lower temperature molten asphaltic binder, so that the asphaltic binder serves as a quenching agent for the pyrolyzed oil fraction.

In another aspect, the disclosed pyrolyzed oil fraction and one or more synthetic polymers are combined with an asphaltic binder to provide a polymer modified asphalt composition.

The present invention also provides modified asphaltic binder compositions containing such reduced-PAH oil fractions. In addition, the present invention provides asphalt paving mixtures containing such modified asphaltic binder compositions and aggregate. The disclosed modified asphaltic binder compositions and asphalt paving mixtures may be used in asphaltic construction products for a variety of uses including paving, roofing, waterproofing and protective coatings.

The disclosed methods and compositions can employ materials obtained by pyrolyzing waste tires or other post-consumer rubber products to modify asphaltic materials. The pyrolysis step is performed separately from modification of the asphaltic material. The benefits of doing so may include one or more of reduced processing time, reduced temperature, and improved plant safety due to reduced fire risk. The disclosed methods and compositions also enable improved control of ingredients in the modified asphaltic material (e.g., char content, low flash point components or PAH compounds), thereby providing benefits such as improved product stability due to reduced particulate separation and settlement, reduced product flammability due to the removal of low flash point components, and improved product safety due to reduced PAH content.

Definitions

In this specification, the following terms have the following meanings unless clearly otherwise specified:

Numerical ranges expressed using endpoints include all numbers subsumed within that range (e.g., 1 to 5 includes 1, 1.5, 2, 2.75, 3, 3.80, 4 and 5). All percentages are weight percentages unless otherwise stated.

The term "about" refers to a range of numbers that may be considered equivalent to a recited value (e.g., having the same function or result), and includes values rounded to the nearest significant figure.

The term "char" refers to a combustible solid organic residue remaining after thermal conversion of a rubber product (e.g., whole tires, ground tire rubber or other whole or comminuted rubber product) using pyrolysis or another at least partially destructive, incompletely oxygenated thermal conversion technique.

The terms "char oil" and "pyrolysis oil" are used interchangeably, and refer to a combustible liquid organic residue remaining after thermal conversion of a rubber product (e.g., whole tires, ground tire rubber or other whole or comminuted rubber product) using pyrolysis or another at least partially destructive, incompletely oxygenated thermal conversion technique.

The term "polymer" includes, independently, homopolymers, copolymers, terpolymers, block copolymers, segmented copolymers, graft copolymers, and any mixture or combination thereof.

The terms "polycyclic aromatic hydrocarbon", "PAH", "polycyclic aromatic" and "PCA" are used interchangeably, and refer to polycyclic compounds that may be classified as carcinogenic, mutagenic or toxic to reproduction. Potential such compounds that may be found in scrap tires include benzo(a)pyrene (BaP, CAS No. 50-32-8), benzo(e)pyrene (BeP, CAS No. 192-97-2), benzo(a)anthracene (BaA, CAS No. 56-55-3), chrysene (CHR, CAS No. 218-01-9), benzo(b)fluoranthene (BbFA, CAS No. 205-99-2), benzo(j)fluoranthene (BjFA, CAS No. 205-82-3), benzo(k)fluoranthene (BkFA, CAS No. 207-08-9) and dibenzo(a,h)anthracene (DBAhA, CAS No. 53-70-3). The presence and amount of such compounds may be evaluated using gas chromatography/mass spectrometry (GC/MS) procedures that will be familiar to persons having ordinary skill in analytical chemistry.

The term "post-consumer waste" refers to waste produced by the end use consumer of a material stream. Post-consumer waste includes garbage or materials generated from garbage that individuals routinely discard. Post-consumer waste may be distinguished from "pre-consumer waste", which is manufacturing waste that can be reintroduced back into a manufacturing process. Pre-consumer waste polymers are generally of either natural origin or synthetic origin, whereas post-consumer polymers generally may be of natural, synthetic or both natural and synthetic origin, and may contain other compounds or materials. Scrap tire rubber can be regarded as post-consumer waste containing post-consumer polymers.

The term "pyrolysis" refers to actual pyrolysis or any other incompletely oxygenated thermal conversion technique that at least partially destroys an organic material and enables the separation or recovery of one or more organic components present in or useful in making such organic material.

The term "translucent" as used with respect to an oil or other liquid product means that when a standard 150 mm tall×14 mm inside diameter glass test tube is filled with the liquid and placed atop a sheet of white paper bearing the phrase "Can you read this?" printed in black 22 point type, the letters can be read through the test tube using normal overhead indoor illumination.

BRIEF DESCRIPTION OF THE DRAWING

FIG. 1 is a flow chart showing steps or components that may be used in the disclosed methods.

Like reference symbols in the various figures of the drawing indicate like elements. The elements in the drawing are not to scale.

DETAILED DESCRIPTION

Referring to FIG. 1, waste tires 101 may be processed 103 to convert tires 101 to reduced size rubber or GTR which can then be pyrolyzed 105. Alternatively, tires 101 may be pyrolyzed 105 in whole form without a prior size reduction step. Pyrolysis 105 yields components including waste gas 107, pyrolysis oil 108, carbon solids 109 and ash (not shown in FIG. 1). Waste gas 107 may be incinerated, flared, or compressed, for example to provide fuel which may be employed in pyrolysis 105 or in any other process that uses thermal energy. Carbon solids 109 may be collected as carbon black and used, for example, as an ingredient for the manufacture of tires or other rubber products.

Pyrolysis oil 109 preferably is fractionated 113 to remove light oil cut 115 which may for example have an initial boiling point less than 350° C. (662° F.). Light oil cut 115 may be used as a burner fuel or sold for use as a solvent. Heavy oil cut 117 which may for example have an initial boiling point greater than 350° C. (662° F.) is processed further to remove at least some and preferably the major weight proportion of PAH compounds in oil 117. A variety of PAH removal techniques may be employed, including further fractionation 119 to isolate oil components falling with a desired boiling point temperature range (for example, oils with an initial boiling point from 350° C. (662° F.) to 600° C. (1112° F.), solvent extraction 121, centrifugation 123 or wipe film evaporation 125. As will be appreciated by persons having ordinary skill in the art, PAH removal is not limited to techniques 119 through 125, and may involve any suitable technique by which PAH compounds in heavy oil cut 117 may be at least partially and preferably largely or wholly removed from end use product 127. Also, two or more PAH removal techniques including any two or more of techniques 119 through 125 may be combined to provide more complete or more economical PAH removal. For example, heavy oil cut 117 may be subjected to further fractionation 119 followed by solvent extraction 121 to remove a greater proportion of PAH compounds than may be accomplished using either further fractionation or solvent extraction alone.

In the course of PAH removal, dissolved or suspended rubber materials and suspended carbon particles in heavy oil cut 117 typically will also be removed or otherwise isolated. Such rubber materials and carbon particles may for example be concentrated in black oil residual byproduct 129. Typically, the concentrations of such rubber and carbon materials will be such that both heavy oil cut 117 and residual black oil byproduct 129 are opaque black liquids. Suspended rubber materials and suspended carbon particles may also be removed using filtration. In a preferred embodiment, the chosen PAH removal technique or techniques remove sufficient dissolved or suspended rubber materials and sufficient suspended carbon particles from heavy oil cut 117 so that oil 117 will be converted from an opaque black liquid to a light-colored (e.g., amber-colored and optionally translucent) end use product 127.

A variety of whole or size-reduced rubber articles or rubber particles may be used in the disclosed invention. Whole (and preferably ground) used or waste tires are an especially desirable rubber source. Other sources include waste from tire retreading facilities, used gaskets and seals, and used membranes from waterproofing, roofing membranes and other rubber-containing products. For reduced-size rubber, a variety of particle sizes (including GTR and coarse rubber particle sizes) may be employed. Finer sizes generally cost more due to the additional grinding required to achieve uniform small particles, and consequently coarse rubber or larger size GTR particles may be preferred. Larger particle sizes may also be preferred when it is desired to only partially pyrolyze the rubber, leaving solid unpyrolyzed or incompletely pyrolyzed rubber particles in a solid product stream that is also added to or otherwise combined with the asphaltic binder. Such unpyrolyzed or incompletely pyrolyzed rubber particles can impart beneficial flexibility, shock resistance or crack-blunting properties to a modified asphalt composition.

A variety of pyrolysis systems may be used in the disclosed methods. For example, size-reduced rubber pyrolysis typically involves heating GTR or coarse rubber particles derived from waste tires to convert the rubber to molecularly simpler and lower molecular weight organic compounds. The heating step normally is performed in the absence or substantial absence of oxygen. As discussed above, the products obtained from pyrolysis typically include waste gas 107, pyrolysis oil 109, carbon solids 111 and ash. The pyrolysis oil fraction 109 may be referred to as "liquified rubber" or "LR" when it also contains ample quantities of rubber particles. The carbon solids fraction 111 may be referred to as "char", "carbon char", "tire derived char" or "tire derived carbon char", and typically contains a substantial amount of carbon black. The pyrolysis reactor may be operated using batch feed or continuous feed rubber loading. Batch feed systems process a single charge of rubber feed stock at one time. After the required residence time in the batch thermal reactor, solid, liquid and if need be gaseous product streams (which may be consumed by combustion during pyrolysis) and any remaining residue are removed. In continuous feed systems, the rubber feed stock is conveyed through the reactor, and solid, liquid and gaseous product streams and residue are continuously discharged or consumed. When processing waste tires, it will be observed that tires typically contain over 80% carbon and hydrogen, and that these elements will form the principle constituents of the solid, liquid and gaseous pyrolysis product streams. The pyrolysis process relies on the addition of heat to break chemical bonds, including carbon-carbon, sulfur-carbon and sulfur-sulfur bonds, and provides a mechanism by which organic compounds decompose and vaporize. Most systems for pyrolysis of waste tire rubber and other hydrocarbons employ operating temperatures of about 480 to 1740° C. At temperatures above about 480° C., shredded tires release increasing amounts of oil and gas. Above about 750° C., and depending on the process employed, the yield of oil and solid tire derived char may decrease relative to gas production. Pyrolysis may be carried out at reduced pressure, e.g. under vacuum, or at atmospheric pressure, with reduced pressure processes often providing increased pyrolyzed oil yields. Yields may also be affected by the types of tires or other rubber-containing products present in the feed stream (e.g., passenger, truck, all-season or snow tires). The pyrolysis process parameters may be adjusted to provide an optimized yield of pyrolysis (e.g., tire-derived) char and oil and to provide desired hydrocarbon by-products for modifying asphaltic binders.

In one preferred embodiment, the pyrolysis processing time, temperatures and vacuum or pressures are adjusted to produce a thermal reactor output suitable for direct injection of a reduced-PAH pyrolyzed oil fraction into asphalt as an asphalt modifier. In such embodiment, the waste tire rubber may or may not be completely pyrolyzed, but may also be combined with the asphaltic binder. Modified asphalts made using partially pyrolyzed rubber can have elastic and other properties not available in modified asphalts made using other tire rubber asphalt modification processes in which the rubber undergoes complete breakdown to low molecular weight species.

As discussed above, PAH compound reduction or removal may be carried out using processes including fractionation, solvent extraction, centrifugation and wipe-film evaporation. Fractionation of pyrolysis oil 113 and further fractionation of heavy oil cut 117 using temperature ranges selected to optimize the yield of end use product 127 represents an especially preferred approach. For example, fractionation may be performed to capture portions of heavy oil cut 117 having an initial boiling point of at least about 300° C., at least about 310° C., at least about 320° C., at least about 330° C., at least about 340° C., at least about 350° C., at least about 360° C., at least about 370° C., at least about 380° C., at least about 390° C. or at least about 400° C. The upper end of the fractionation range may for example correspond to an initial boiling point of about 550° C., about 560° C., about 570° C., about 580° C., about 590° C., about 600° C., about 610° C., about 620° C., about 630° C., about 640° C. or about 650° C.

When PAH compound reduction or removal is carried out using solvent extraction, the solvent or solvents employed, and the temperature(s) and pressure(s) at which solvent extraction is performed, may be chosen based on a variety of factors that will be understood by persons having ordinary skill in the art. For example, solvents may be chosen based on the solubility or lack of solubility of polycyclic aromatic compounds in such solvents, or based on the solubility or lack of solubility in such solvents of desired asphalt-modifying components present in heavy oil cut 117. Also, the chosen temperature may be at, above or below room temperature (25° C.) and if desired may be at a supercritical fluid temperature. Exemplary solvents include alkanes such as heptane (B.P. 98° C.), octane (B.P. 126° C.), mineral spirits (B.P. 140-300° C.) and mixtures thereof; aromatic hydrocarbons including toluene (B.P. 110° C.), xylene (B.P. 140° C.) and ligroin (B.P. 60-90° C.); cyclic compounds such as N-methyl-2-pyrrolidone (B.P. 202° C.) and furfural (B.P. 162° C.); dimethyl sulfoxide (B.P. 189° C.); commercially-available materials such as the "AROMATIC" series fluids (e.g., AROMATIC 150 and AROMATIC 200) from Exxon-Mobil Corp. and the SHELLSOL™ series fluids (e.g., SHELLSOL A100 and SHELLSOL A150) from Shell Chemical Co, and mixtures thereof; petroleum solvents including petroleum naphtha, VM&P naphtha, Stoddard solvent, kerosene (B.P. 150° C.) and mixtures thereof, plant-derived solvents including turpentine (B.P. 150-180° C.); ketones including methyl ethyl ketone (B.P. 80° C.), methyl isobutyl ketone (B.P. 117° C.), methyl isoamyl ketone (B.P. 144° C.), methyl amyl ketone (B.P. 150° C.), cyclohexanone (B.P. 156° C.), isobutyl ketone (B.P. 168° C.), methyl hexyl ketone (B.P. 173° C.), methyl heptyl ketone (B.P. 192° C.) and mixtures thereof; aromatic alcohols such as benzyl alcohol (B.P. 203-205° C.), toluene alcohols and the like; alcohol and glycol ethers, esters and mixed ethers and esters such as ethylene glycol (B.P. 195° C.), propylene glycol (B.P. 188° C.), 1,3-butylene glycol (B.P. 204° C.), diethylene glycol (B.P. 245° C.), 1,6-hexanediol (B.P. 250° C.), decanol (B.P. 231° C.), the series of CELLOSOLVE™ and CARBITOL™ solvents available from Dow Chemical Company and the series of glyme and diglyme solvents available from Clariant Corporation; and other fluids such as supercritical carbon dioxide.

When PAH compound reduction or removal is carried out using centrifugation, processing conditions may for example be selected to remove solids and especially carbon black particles from heavy oil cut 117, as appreciable quantities of PAH compounds may also be separated along with such solids.

When PAH compound reduction or removal is carried out using wipe film evaporation, process temperatures like those discussed above for further fractionation may be employed.

In certain embodiments, the total PAH content in the disclosed reduced-PAH pyrolyzed oil fraction is less than about 100 ppm, less than about 50 ppm, less than about 30 ppm, less than about 20 ppm or less than about 10 ppm by weight. Rather than specifying a total PAH content in such pyrolyzed oil fraction, a simpler approach is to specify a total amount of a specific set of PAH compounds. For example, the disclosed reduced-PAH pyrolyzed oil fraction may contain less than about 100 ppm, less than about 50 ppm, less than about 30 ppm, less than about 20 ppm or less than about 10 ppm total concentration of benzo(a)pyrene, benzo(e)pyrene, benzo(a)anthracene, chrysene, benzo(b)fluoranthene, benzo(j)fluoranthene, benzo(k)fluoranthene and dibenzo(a,h)anthracene by weight. A further approach is to specify a total amount of a specific PAH compound. For example, the disclosed reduced-PAH pyrolyzed oil fraction may contain less than about 10 ppm, less than about 5 ppm, less than about 3 ppm, less than about 2 ppm or less than about 1 ppm by weight benzo(a)pyrene.

End use product 127 desirably is a translucent, low coloration (e.g., amber colored) liquid having a low solids content and especially a low carbon black content when evaluated at room temperature. In certain embodiments, the carbon black content in such end use product is less than about 5 wt. %, less than about 2 wt. %, less than about 1 wt. %, less than about 0.5 wt. %, or less than about 0.1 wt. %. Expressed in terms of flash point values, end use product 127 may for example have an open cup flash point of at least 50° C., at least 60° C., at least 70° C., at least 80° C., at least 90° C., or at least 100° C.

The disclosed reduced-PAH pyrolyzed oil fraction may be added to an asphaltic binder at a variety of addition levels. The desired addition level will normally be selected based in part on the impact such oil addition may have on the properties and intended end use of the thus-modified asphaltic binder. For example, for asphalt compositions used in paving applications, addition of the reduced-PAH pyrolyzed oil fraction may increase the asphaltic binder penetration value, lower the binder softening point, and alter pavement aging characteristics including the pavement grade rating (e.g., the Superpave PG value), susceptibility to aging, and other performance metrics. Similar considerations will apply to other end uses such as roofing materials and waterproofing membranes. By way of example, the disclosed reduced-PAH pyrolyzed oil fraction may be used as a viscosity modifier in the production of specification grade asphalt paving binders; as an asphalt rejuvenator in the repair or restoration of existing pavements; as an aromatic compatibilizing agent for polymer-modified asphalt paving and roofing binders; as a fluxing oil in the preparation of asphalt emulsion base binders; as a viscosity modifier in the production of shingles, roll roofing and other roofing materials; and as a plasticizer in the production of waterproofing membranes. The desired pyrolyzed oil amounts for each of these applications may vary based on a number of considerations. As a general guide however, the reduced-PAH pyrolyzed oil fraction may be added to an asphaltic binder at levels of at least about 0.5, at least about 1, at least about 2, at least about 3, at least about 4 or at least about 5 wt. % based on the combined weight of oil and binder, and at levels of up to about 30, up to about 25, up to about 20, up to about 15, up to about 13 or up to about 10 wt. % based on the combined weight of oil and binder.

A variety of asphaltic binders may be modified using the disclosed methods. Exemplary asphalts include oxidized or air-blown asphalts, non-oxidized asphalts and blends thereof. Asphalt blowing, also referred to as oxidation or air rectification, may for example be used to produce oxidized or air blown asphalts of desired consistency from a softer asphalt than the final asphalt product yielded by the blowing process. The desired result of the blowing process is an increase in softening point and a reduction in penetration values over that of the starting, base asphalt. Typically, the blowing process includes heating the base asphalt, generally to a temperature of about 232° C. (450° F.) to 260° C. (500° F.), and blowing air into the hot asphalt for a period of time required to yield the desired properties. The blowing process is a temperature-time dependent process with an inverse relationship of temperature and time. Thus, at higher temperatures the blowing time is generally less than the time required to achieve the same properties at lower temperature. The exchange surface or contact surface between the hot asphalt and the air forced into it generally also is a factor in determining the blowing process length and the required air quantity.

Exemplary asphalts also include, but are not limited to, asphalt produced from atmospheric distillation, vacuum distillation, solvent extraction, or combinations of these methods. Still other exemplary asphalts include naturally occurring asphalts such as gilsonite, asphaltites, and the like.

In an embodiment, the disclosed pyrolyzed oil fraction is combined with (e.g., injected into) a lower temperature molten asphaltic binder, so that the asphaltic binder serves as a quenching agent for the pyrolyzed oil fraction. The pyrolyzed oil fraction may for example be within or near the range of distillation temperatures employed for fractionation, and the asphaltic binder may at or slightly above its melting temperature. In some embodiments, the reduced-PAH pyrolyzed oil fraction is at least 25° C., at least 50° C. or at least 75° C. hotter than the molten asphaltic binder before the reduced-PAH pyrolyzed oil fraction and binder are combined.

In an embodiment, the disclosed pyrolyzed oil fraction is combined with a suitable solvent (e.g., petroleum distillates) prior to being combined with an asphaltic binder. Depending in part on the type and amount of solvent employed, the resulting mixture may be used for example to prepare cutback asphalts, asphalt patching compounds, asphalt surface treatments and other asphalt-containing compositions.

In another embodiment, one or more synthetic or post-consumer polymers may be added as a modifier to enhance specific physical characteristics of the resulting composition. Exemplary polymers include those that assist in providing desired properties for the resulting modified asphalt binder. Preferred polymers will be familiar to persons having ordinary skill in the art, and include elastomers (rubbers or elastics) such as styrene-butadiene rubber (SBR) and styrene-butadiene-styrene (SBS), and plastomers (plastics) such as polyethylene (e.g., low-density polyethylene, or "LDPE"), polypropylene (e.g., atactic polypropylene) and ethylene vinyl acetate (EVA). The polymers may for example represent about 0.5% to 30% by weight of the asphalt binder depending on properties desired.

In another embodiment, the disclosed modified asphalt composition is used to prepare an asphalt emulsion. Persons having ordinary skill in the art will be familiar with emulsion manufacturing techniques, which are described for example in Transportation Research Circular E-C102, *Asphalt Emulsion Technology* (2006).

The disclosed invention is further illustrated in the following non-limiting examples. Performance grading via AASHTO M320 using dynamic shear rheology and bending beam rheology may be used to demonstrate the effectiveness of modifiers in modification of asphaltic binders. The specific grade of asphalt and the type and amount of modifier employed in the asphalt may impact the reported values. Values reported are intended to show modifier affects and not ability to meet specific grades. In the interest of simplicity, the compositions were first prepared without reducing or removing PAH compounds from the pyrolyzed oil samples.

EXAMPLE 1

Selected product streams from commercial tire rubber pyrolysis units were used as is or recombined and added to a standard Superpave PG64-22 asphalt binder to provide modified asphalt binders. When carrying out vacuum tire rubber pyrolysis of 100% rubber chips, a conventional pyrolysis unit typically may yield about 37% solid char, about 53% liquids and about 9% gases, with the 53% liquids representing about 85% materials having a flash point greater than 350° C., and about 15% materials having a flash point less than 350° C. Both the char ("Solids") and the greater than 350° C. flash point fraction ("Oil") were used to prepare three modified asphalts. The three modified asphalts respectively contained 16.4, 8.2 and 4.1 wt. % combined Solids and Oil, and were respectively designated as "20% tire rubber equivalent" or "20% TRE", "10% TRE" and "5% TRE" to indicate their approximate correspondence to modified asphalts made by adding 20%, 10% or 5% tire rubber directly to asphalt and then heating the asphalt to break down the tire rubber. The ingredients in the modified asphalts are shown below in Table 1:

TABLE 1

|  | 20% TRE | 10% TRE | 5% TRE |
| --- | --- | --- | --- |
| Asphalt | 83.6% | 91.8% | 95.9% |
| Solids | 7.4% | 3.7% | 1.9% |
| Oil | 9.0% | 4.5% | 2.3% |

Binder grading properties for the unmodified PG64-22 binder are shown below in Table 2:

TABLE 2

| ORIGINAL BINDER: PG 64-22 | | | |
|---|---|---|---|
| PROPERTY SUPERPAVE PG Asphalt Binder Grade | | TEST METHOD AND SPECIFICATION AASHTO M 320 Table 1 | RESULTS TG66.3-23.5 |
| Flash, COC ° C. | | T 48 | Report | 346° C. |
| Rotational Viscosity, Pa · s | 135° C. | T 316 | 3.0 max | 0.390 Pa · s |
| Penetration, (Pen/DSR Correlation) | 25° C. | | Report | G* 292 kPa Correlation 71 dmm |
| Grade: Dynamic Shear, k · Pa (G */sin δ, 10 rad/sec) | 64° C. 70° C. ° C. | T 315 | 1.0 min  Pass/Fail Temp | 1.35 kPa 0.626 kPa 66.3° C. |
| RTFO RESIDUE: AASHTO T 240 | | | |
| Grade: Dynamic Shear, k · Pa(G */sin δ, 10 rad/sec) | 64° C. 70° C. ° C. | T 315 | 2.2 min  Pass/Fail Temp | 3.41 kPa 1.51 kPa 67.2° C. |
| PRESSURE AGING RESIDUE: AASHTO R 28 100° C., 20 hrs, 300 psi | | | |
| | 25° C. 22° C. ° C. | T 315 | 5,000 max  Pass/Fail Temp | 3970 kPa 5780 kPa 23.2° C. |
| Creep Stiffness | Stiffness, MPa (60 sec) M-value | −12° C. | T 313 | 300 max 0.300 min | 190 MPa 0.312 |
| Creep Stiffness | Stiffness, MPa (60 sec) M-value | −18° C. | T 313 | 300 max 0.300 min | 370 MPa 0.264 |
| Creep Stiffness | Stiffness, MPa (60 sec) M-value | −° C. | T 313 | S-Pass/ Fail Temp M-Pass/ Fail Temp | −16.1° C. −13.5° C. |
| ΔTc 20 hour PAV | | | | −2.6 |
| PRESSURE AGING RESIDUE: AASHTO R 28 100° C., 40 hrs, 300 psi | | | |
| Creep Stiffness | Stiffness, MPa (60 sec) M-value | −6° C. | T 313 | 300 max 0.300 min | 108 MPa 0.319 |
| Creep Stiffness | Stiffness, MPa (60 sec) M-value | −12° C. | T 313 | 300 max 0.300 min | 202 MPa 0.277 |
| Creep Stiffness | Stiffness, MPa (60 sec) M-value | −° C. | T 313 | S-Pass/ Fail Temp M-Pass/ Fail Temp | −15.8° C. −8.7° C. |
| ΔTc 40 hour PAV | | | | −7.1 |

Binder grading properties for the blends identified as 20% TRE, 10% TRE and 5% TRE in PG64-22 are respectively shown below in Tables 3, 4 and 5:

TABLE 3

| 20% TRE Blend in PG 64-22 | | |
|---|---|---|
| PROPERTY SUPERPAVE PG Asphalt Binder Grade | TEST METHOD AND SPECIFICATION AASHTO M 320 Table 1 | RESULTS TG56.0-30.9 |
| Flash, COC ° C. | T 48 | Report | 271° C. |
| Separation Test | T 53 | Report | Top/bottom 36.2° C./37.3° C. Diff = 1.1° C. DSR @52° C. Top/DSR Bottom 1.33 kPa/1.59 kPa Diff = 0.26 kPa |

TABLE 3-continued

20% TRE Blend in PG 64-22

| PROPERTY SUPERPAVE PG Asphalt Binder Grade | TEST METHOD AND SPECIFICATION AASHTO M 320 Table 1 | | RESULTS TG56.0-30.9 |
|---|---|---|---|
| Solubility in TCE | | T 44 Report | 92.78% |
| Rotational Viscosity, Pa·s | 135° C. | T 316 3.0 max | 0.216 Pa·s |
| Penetration | 25° C. | T 49 Report | 188 dmm |
| Grade: Dynamic Shear, k·Pa (G*/sin δ, 10 rad/sec) | 52° C. 58° C. ° C. | T 315 1.0 min Pass/Fail Temp | 1.69 kPa 0.762 kPa 56.0° C. |
| RTFO RESIDUE: AASHTO T 240 | | | |
| Mass Change, % | | T 240 1.0 max | −1.48% |
| Grade: Dynamic Shear, k·Pa(G*/sin δ, 10 rad/sec) | 58° C. 64° C. ° C. | T 315 2.2 min Pass/Fail Temp | 2.37 kPa 1.05 kPa 58.5° C. |
| PRESSURE AGING RESIDUE: AASHTO R 28 100° C., 20 hrs, 300 psi | | | |
| Grade: Dynamic Shear, k·Pa(G*·sin δ, 10 rad/sec) | 19° C. 16° C. ° C. | T 315 5,000 max Pass/Fail Temp | 3970 kPa 6000 kPa 17.3° C. |
| Creep Stiffness, Stiffness MPa (60 sec) M-value | −18° C. | T 313 300 max 0.300 min | 209 MPa 0.326 |
| Creep Stiffness, Stiffness MPa (60 sec) M-value | −24° C. | T 313 300 max 0.300 min | 445 MPa 0.283 |
| Creep Stiffness, Stiffness MPa (60 sec) M-value | −° C. | T 313 S-Pass/Fail Temp M-Pass/Fail Temp | −20.9° C. −21.6° C. |
| ΔTc 20 hour PAV | | | 0.8 |
| PRESSURE AGING RESIDUE: AASHTO R 28 100° C., 40 hrs, 300 psi | | | |
| Creep Stiffness, Stiffness MPa (60 sec) M-value | −12° C. | T 313 300 max 0.300 min | 114 MPa 0.344 |
| Creep Stiffness, Stiffness MPa (60 sec) M-value | −18° C. | T 313 300 max 0.300 min | 253 MPa 0.296 |
| Creep Stiffness, Stiffness MPa (60 sec) M-value | −° C. | T 313 S-Pass/Fail Temp M-Pass/Fail Temp | −19.3° C. −17.5° C. |
| ΔTc 40 hour PAV | | | −1.8 |

TABLE 4

10% TRE Blend in PG 64-22

| PROPERTY SUPERPAVE PG Asphalt Binder Grade | TEST METHOD AND SPECIFICATION AASHTO M 320 Table 1 | | RESULTS TG61.3-26.9 |
|---|---|---|---|
| Flash, COC ° C. | | T48 Report | 302° C. |
| Separation Test | | T53 Report | Top/bottom 43.3° C./43.5° C. Diff = 0.2° C. DSR @58° C. Top/DSR Bottom 1.67 kPa/1.79 kPa Diff = 0.12 kPa |
| Solubility in TCE | | T44 Report | 97.05% |
| Rotational Viscosity, Pa·s | 135° C. | T316 3.0 max | 0.298 Pa·s |
| Penetration, (Pen/DSR Correlation) | 25° C. | Report | G* 121 kPa Correlation 114 dmm Actual Pen 104 dmm |

TABLE 4-continued

10% TRE Blend in PG 64-22

| PROPERTY SUPERPAVE PG Asphalt Binder Grade | TEST METHOD AND SPECIFICATION AASHTO M 320 Table 1 | | RESULTS TG61.3-26.9 |
|---|---|---|---|
| Grade: Dynamic Shear, k · Pa (G */sin δ, 10 rad/sec) | 58° C. 64° C. ° C. | T315 Pass/Fail Temp | 1.0 min | 1.55 kPa 0.701 kPa 61.3° C. |

RTFO RESIDUE: AASHTO T 240

| Mass Change, % | | T240 | 1.0 max | −0.83% |
|---|---|---|---|---|
| Grade: Dynamic Shear, k · Pa(G */sin δ, 10 rad/sec) | 58° C. 64° C. ° C. | T315 Pass/Fail Temp | 2.2 min | 4.63 kPa 2.00 kPa 63.3° C. |

PRESSURE AGING RESIDUE: AASHTO R 28 100° C., 20 hrs, 300 psi

| Grade: Dynamic Shear, k · Pa(G * · sin δ, 10 rad/sec) | 25° C. 22° C. 19° C. ° C. | T315 Pass/Fail Temp | 5,000 max | 2650 kPa 4000 kPa 5890 kPa 20.3° C. |
|---|---|---|---|---|
| Creep Stiffness | Stiffness, MPa (60 sec) M-value | −12° C. T313 | 300 max 0.300 min | 129 MPa 0.355 |
| Creep Stiffness | Stiffness, MPa (60 sec) M-value | −18° C. T313 | 300 max 0.300 min | 290 MPa 0.287 |
| Creep Stiffness | Stiffness, MPa (60 sec) M-value | −° C. T313 | S-Pass/Fail Temp M-Pass/Fail Temp | −18.3° C. −16.9° C. |
| ΔTc 20 hour PAV | | | | 1.4 |

PRESSURE AGING RESIDUE: AASHTO R 28 100° C., 40 hrs, 300 psi

| Creep Stiffness | Stiffness, MPa (60 sec) M-value | −12° C. T313 | 300 max 0.300 min | 161 MPa 0.317 |
|---|---|---|---|---|
| Creep Stiffness | Stiffness, MPa (60 sec) M-value | −18° C. T313 | 300 max 0.300 min | 336 MPa 0.263 |
| Creep Stiffness | Stiffness, MPa (60 sec) M-value | −° C. T313 | S-Pass/Fail Temp M-Pass/Fail Temp | −17.1° C. −13.9° C. |
| ΔTc 40 hour PAV | | | | −3.2 |

TABLE 5

5% TRE Blend in PG 64-22

| PROPERTY SUPERPAVE PG Asphalt Binder Grade | TEST METHOD AND SPECIFICATION AASHTO M 320 Table 1 | | RESULTS TG64.2-25.6 |
|---|---|---|---|
| Flash, COC ° C. | | T 48 | Report | 328° C. |
| Separation Test | | T 53 | Report | Top/bottom 45.9° C./45.8° C. Diff = 0.1° C. DSR Top/DSR Bottom 0.995 kPa/1.03 kPa Diff = 0.35 kPa |
| Solubility in TCE | | T 44 | Report | 98.6% |
| Rotational Viscosity, Pa · s | 135° C. | T 316 | 3.0 max | 0.343 Pa · s |
| Penetration, (Pen/DSR Correlation) | 25° C. | | Report | G* 199 kPa Correlation 87 dmm Actual Pen 78 dmm |
| Grade: Dynamic Shear, k · Pa (G */sin δ, 10 rad/sec) | 64° C. 70° C. ° C. | T 315 Pass/Fail Temp | 1.0 min | 1.03 kPa 0.484 kPa 64.2° C. |

TABLE 5-continued

5% TRE Blend in PG 64-22

| PROPERTY | TEST METHOD AND SPECIFICATION | | RESULTS |
|---|---|---|---|
| SUPERPAVE PG Asphalt Binder Grade | AASHTO M 320 Table 1 | | TG64.2-25.6 |
| RTFO RESIDUE: AASHTO T 240 | | | |
| Mass Change, % | T 240 | 1.0 max | −0.43% |
| Grade: Dynamic Shear, k · Pa(G */sin δ, 10 rad/sec) | 64° C. T 315 | 2.2 min | 2.63 kPa |
| | 70° C. | | 1.19 kPa |
| | ° C. | Pass/Fail Temp | 65.3° C. |
| PRESSURE AGING RESIDUE: AASHTO R 28 100° C., 20 hrs, 300 psi | | | |
| Grade: Dynamic Shear, k · Pa(G * · sin δ, 10 rad/sec) | 25° C. | | 3260 kPa |
| | 22° C. T 315 | 5,000 max | 4870 kPa |
| | 19° C. | | 7090 kPa |
| | ° C. | Pass/Fail Temp | 21.8° C. |
| Creep Stiffness | −12° C. T 313 | 300 max | 149 MPa |
| MPa (60 sec) M-value | | 0.300 min | 0.34 |
| Creep Stiffness | −18° C. T 313 | 300 max | 334 MPa |
| MPa (60 sec) M-value | | 0.300 min | 0.274 |
| Creep Stiffness | −° C. T 313 | S-Pass/Fail Temp | −17.2° C. |
| MPa (60 sec) M-value | | M-Pass/Fail Temp | −15.6° C. |
| ΔTc 20 hour PAV | | | −1.6 |
| PRESSURE AGING RESIDUE: AASHTO R 28 100° C., 40 hrs, 300 psi | | | |
| Creep Stiffness | −6° C. T 313 | 300 max | 84.8 MPa |
| MPa (60 sec) M-value | | 0.300 min | 0.347 |
| Creep Stiffness | −18° C. T 313 | 300 max | 187 MPa |
| MPa (60 sec) M-value | | 0.300 min | 0.286 |
| Creep Stiffness | −° C. T 313 | S-Pass/Fail Temp | −15.6° C. |
| MPa (60 sec) M-value | | M-Pass/Fail Temp | −10.6° C. |
| ΔTc 40 hour PAV | | | −6 |

The results in Tables 3 through 5 show that the modified binders had several improved properties compared to the unmodified PG64-22 asphalt binder. In particular, very favorable 40 hour pressure aging vessel results (ΔTc 40 hour PAV) were observed, with a reduction from −7.1 ΔTc for the unmodified binder to respective values of −5.0, −3.2 and −1.8 for the 5% TRE, 10% TRE and 20% TRE samples.

EXAMPLE 2

Using the method of Example 1, the greater than 350° C. flash point Oil fraction obtained from the tire pyrolysis unit may be subjected to fractional distillation to remove components with an initial boiling point from 350° C. to 600° C., leaving behind a black oil residue containing carbon black and concentrated PAH compounds and providing an amber-colored oil fraction containing reduced PAH compounds. Upon addition of this amber-colored oil fraction and the char from the tire Pyrolysis unit to PG64-22 asphalt binder to provide 20% TRE, 10% TRE and 5% TRE blends, modified binders like those in Tables 3 through 5 but with reduced PAH levels will be obtained, while still providing several improved properties compared to the unmodified PG64-22 asphalt binder.

EXAMPLE 3

Using the method of Example 1, the greater than 350° C. flash point Oil fraction obtained from the tire pyrolysis unit may be subjected to supercritical fluid or direct solvent extraction using any of N-methyl-2-pyrrolidone, dimethyl sulfoxide or furfural to remove non-PAH components while leaving behind a black oil residue containing carbon black and concentrated PAH compounds and providing an amber-colored oil fraction containing reduced PAH compounds. Upon addition of this amber-colored oil fraction and the char from the tire Pyrolysis unit to PG64-22 asphalt binder to provide 20% TRE, 10% TRE and 5% TRE blends, modified binders like those in Tables 3 through 5 but with reduced PAH levels will be obtained, while still providing several improved properties compared to the unmodified PG64-22 asphalt binder.

EXAMPLE 4

Using the method of Example 1, the greater than 350° C. flash point Oil fraction obtained from the tire pyrolysis unit may be centrifuged and decanted to separate and leave behind a black oil residue containing carbon black and concentrated PAH compounds and isolate an amber-colored oil fraction containing reduced PAH compounds. Upon addition of this amber-colored oil fraction and the char from the tire Pyrolysis unit to PG64-22 asphalt binder to provide 20% TRE, 10% TRE and 5% TRE blends, modified binders like those in Tables 3 through 5 but with reduced PAH levels will be obtained, while still providing several improved properties compared to the unmodified PG64-22 asphalt binder.

EXAMPLE 5

Using the method of Example 1, the greater than 350° C. flash point Oil fraction obtained from the tire pyrolysis unit may be subjected to wipe film evaporation to remove components with an initial boiling point from 350° C. to 600° C., leaving behind a black oil residue containing carbon black and concentrated PAH compounds and providing an amber-colored oil fraction containing reduced PAH compounds. Upon addition of this amber-colored oil fraction and the char from the tire Pyrolysis unit to PG64-22 asphalt binder to provide 20% TRE, 10% TRE and 5% TRE blends, modified binders like those in Tables 3 through 5 but with reduced PAH levels will be obtained, while still providing several improved properties compared to the unmodified PG64-22 asphalt binder.

The above description is directed to the disclosed methods and is not intended to limit them. Those of skill in the art will readily appreciate that the teachings found herein may be applied to yet other embodiments within the scope of the attached claims. The complete disclosures of all cited patents, patent documents, and publications are incorporated herein by reference as if individually incorporated. However, in case of any inconsistencies the present disclosure, including any definitions herein, will prevail.

The invention claimed is:

1. A method for modifying an asphaltic binder, comprising the steps of
   i) at least partially pyrolyzing, separately from such asphaltic binder, whole rubber articles or size-reduced rubber particles to provide one or more pyrolyzed rubber fractions including a pyrolyzed oil fraction having a selected minimum initial boiling point or flash point,
   ii) removing at least some polycyclic aromatic hydrocarbon (PAH) compounds from such pyrolyzed oil fraction to provide a reduced-PAH pyrolyzed oil fraction which may be combined with an asphaltic binder to provide a modified asphalt composition.

2. A method according to claim 1, wherein removing at least some PAH compounds is performed by one or more of:
   a) fractionally distilling the pyrolyzed oil fraction over a temperature range that removes a desired initial boiling point or desired minimum flash point pyrolyzed oil fraction and leaves behind at least some PAH compounds;
   b) solvent extracting the pyrolyzed oil fraction using one or more solvents that remove a desired initial boiling point or desired minimum flash point pyrolyzed oil fraction and leave behind at least some PAH compounds;
   c) centrifuging the pyrolyzed oil fraction to separate a desired initial boiling point or desired minimum flash point pyrolyzed oil fraction from a fraction containing concentrated PAH compounds; or
   d) wiped film evaporating a desired initial boiling point or desired minimum flash point pyrolyzed oil fraction and leaving behind at least some PAH compounds.

3. A method according to claim 2, wherein removing at least some PAH compounds is performed by fractionally distilling the pyrolyzed oil fraction over a temperature range.

4. A method according to claim 2, wherein removing at least some PAH compounds is performed by solvent extraction.

5. A method according to claim 2, wherein removing at least some PAH compounds is performed by centrifuging.

6. A method according to claim 2, wherein removing at least some PAH compounds is performed by wiped film evaporation.

7. A method according to claim 2, wherein removing at least some PAH compounds is performed by filtration of carbon solids from the pyrolyzed oil.

8. A method according to claim 1, wherein the total PAH content in the reduced-PAH pyrolyzed oil fraction is less than about 100 ppm by weight.

9. A method according to claim 1, wherein the reduced-PAH pyrolyzed oil fraction contains less than about 10 ppm by weight total concentration of benzo(a)pyrene, benzo(e)pyrene, benzo(a)anthracene, chrysene, benzo(b)fluoranthene, benzo(j)fluoranthene, benzo(k)fluoranthene and dibenzo(a,h)anthracene.

10. A method according to claim 1, wherein the reduced-PAH pyrolyzed oil fraction contains less than about 5 wt. % carbon black solids and has an open cup flash point of at least 50° C.

11. A method according to claim 1, further comprising using the reduced-PAH pyrolyzed oil fraction as a viscosity modifier in the production of specification grade asphalt paving binders; as an asphalt rejuvenator in the repair or restoration of existing pavements; as an aromatic compatibilizing agent for polymer-modified asphalt paving and roofing binders; as a fluxing oil in the preparation of asphalt emulsion base binders; as a viscosity modifier in the production of shingles, roll roofing and other roofing materials; or as a plasticizer in the production of waterproofing membranes.

12. A method according to claim 1, further comprising combining the reduced-PAH pyrolyzed oil fraction with the asphaltic binder to provide a modified asphalt composition.

13. A method according to claim 12, comprising combining at least about 0.5 wt. % and up to about 30 wt. % reduced-PAH pyrolyzed oil fraction with the asphaltic binder, based on the combined weight of oil and binder.

14. A method according to claim 12, wherein the asphaltic binder is molten and at a lower temperature than the reduced-PAH pyrolyzed oil fraction, so that the asphaltic binder serves as a quenching agent for the pyrolyzed oil fraction.

15. A method according to claim 12, wherein the reduced-PAH pyrolyzed oil fraction and one or more synthetic polymers are combined with the asphaltic binder to provide a polymer modified asphalt composition.

16. A method according to claim 12, further comprising using the modified asphalt composition to prepare an asphalt emulsion for use in pavement construction or maintenance.

17. A method according to claim 12, further comprising using the modified asphalt composition for a pavement maintenance procedure comprising
   a) spraying onto pavement a heated liquid pavement maintenance binder comprising the modified asphalt composition; and
   b) applying aggregate chips to the binder to provide a sealed skid resistant surface.

18. A method according to claim 17, wherein the pavement maintenance binder has a temperature of about 250 to 325° C.

19. A method according to claim 12, further comprising using the modified asphalt composition for a bituminous paving process, which process comprises:
- a) mixing aggregate and a modified asphalt binder containing the reduced-PAH pyrolyzed oil fraction to form a bituminous mix comprising the aggregate coated with the modified asphalt binder; and
- b) compacting the bituminous mix to provide bituminous pavement having field density values of less than 10% in place air voids for the compacted bituminous mix.

* * * * *